United States Patent Office 3,454,536
Patented July 8, 1969

3,454,536
PROCESS FOR THE PREPARATION OF POLYAMIDES
Gerhard Schade, Witten-Bommern, and Franz Blaschke, Witten (Ruhr), Germany, assignors to Chemische Werke Witten G.m.b.H., Witten (Ruhr), Germany
No Drawing. Filed Sept. 24, 1965, Ser. No. 490,078
Claims priority, application Germany, Nov. 12, 1964, C 34,342
Int. Cl. C08g 20/20
U.S. Cl. 260—78                    14 Claims

ABSTRACT OF THE DISCLOSURE

A process for preparing polyamides which comprises forming a preliminary condensate by heating the dimethyl ester of an aromatic dicarboxylic acid and an organic diamine, together with other polyamide-forming reactants if desired, in the presence of water at 90–100° C., distilling off the resultant methanol-water mixture to the point of removing substantially all of the methanol formed in the reaction, and subsequently polycondensing the distillation residue at 250–290° C. to form the desired polyamide.

---

This invention relates to the preparation of polyamides. More particularly, it relates to a process for the preparation of polyamides from the methyl esters of aromatic dicarboxylic acids. Even more particularly, the invention relates to a process for the preparation of polyamides from the methyl esters of terephthalic acid, isophthalic acid or mixtures thereof.

Polyamides made from aromatic dicarboxylic acids and diamines are known in the art. The preparation thereof in accordance with the conventional polycondensation processes carried out in the melt, such as is used for the preparation of polyhexamethyleneadipamide, is generally possible if non-crystallizable or only difficulty crystallizable polymers are being produced. Polyamides containing residues of aromatic dicarboxylic acids which may be prepared in the melt include, for example, certain polyalkyleneterephthalamide/isophthalamides, poly - C-alkylhexamethyleneterephthalamides and mixed polyamides of aminocaproic acid or caprolactam with hexamethylenediamine and terephthalic acid.

In preparing polyamides, generally the desired free acid or a salt thereof is reacted with a diamine. In the case of the aromatic dicarboxylic acids, however, the methyl esters thereof are frequently used in place of the free acids since it is difficult to obtain the free acids in a pure condition because of their poor solubility and low volatility. However, it is advantageous to employ a process which makes it possible to use the methyl esters for the preparation of polyamides since the saponification of these esters in a separate reaction constitutes an additional process step.

It is already known in the art to react a mixture of a methyl ester of an aromatic dicarboxylic acid and an aliphatic diprimary diamine in the melt to give a polyamide by heating the mixture to a high temperature and applying thereto a vacuum. Because of the high excess amount of amine which is required, this process is not very economical and leads to products which, as a result of secondary reactions, have lower melting points than polyamides having theoretically the same composition which are made in the conventional manner from the corresponding salts.

One of the objects of the present invention is to provide a process for the preparation of polyamides of aromatic dicarboxylic acids which overcomes the disadvantages and deficiencies of the prior art methods.

Another object of the present invention is to provide a process for the preparation of polyamides of aromatic dicarboxylic acids wherein the methyl esters thereof may be used directly.

A further object of the invention is to provide a process for the preparation of polyamides of aromatic dicarboxylic acids, using the methyl esters thereof, wherein the products have essentially the same properties as those made in the conventional manner from the corresponding salts.

A still further object of the invention is to provide a process for the preparation of polyamides of aromatic dicarboxylic acids, such as terephthalic acid and isophthalic acid, which may be carried out easily and simply and which avoids the aforementioned problems of the prior art processes.

These and other objects of the present invention will become apparent to those skilled in the art from a reading of the following specification and claims.

In accordance with the present invention, it has been found that polyamides of aromatic dicarboxylic acids may be prepared wherein the methyl esters thereof are used as reactants to give a preliminary condensate and this latter is then subsequently polycondensed. The preliminary condensation is carried out by heating the starting materials to a temperature of 90–100° C. with the addition thereto of water at normal pressure. The methanol-water mixture is largely distilled off at normal pressure and then the distillation residue is polycondensed either initially under the excess pressure with a subsequent release thereof or under normal pressure throughout at temperatures of between 250° and 290° C. Preferably, the methyl esters of terephthalic acid, isophthalic acid or mixtures thereof are used as the acid reactant. The amine component includes compounds which, except for two aliphatically bound primary amino groups, do not contain any future reactive groups. The latter-mentioned amine component may, if desired, be mixed with further polyamide-forming starting materials.

The process of the present invention, as set forth above, permits the preparation of polyamides which do not differ appreciably in properties from products having the same composition which have been made in the conventional manner from the corresponding salts.

It has already been proposed to polycondense alkyl esters of 7-aminoheptane acid under pressure in the presence of water. However, alcohols having secondary hydroxyl groups or higher primary alcohols are preferred as the ester-forming alcohols. The low reactivity thereof, as compared to methanol, has the result that no disturbing secondary reactions are obtained to any great extent in this case. Furthermore, it is known to react the dimethyl ester of sebacic acid with hexamethylenediamine together with water at elevated temperatures in which case, in contrast to the present invention, the methanol split off remains in the reaction mixture up to the polycondensation temperature of 270° C. In this process, however, the end products are not identical with polyamides obtained from the salts of the free acids or with the polyamides obtained according to the process of the present invention, in spite of the fact that all of these have theoretically the same composition (note Example I(c) below).

The preparation of the preliminary condensates according to the present invention is effected by stirring an essentially equimolecular mixture of the aromatic dicarboxylic acid ester with the respective diamine in the presence of water at a temperature of about 90–95° C. In view of the solubility of the preliminary condensate in water, at least 45 parts by weight of water per 100 parts by weight of aromatic dicarboxylic acid methyl ester must be employed. The reaction may be conducted either under reflux or with the simultaneous distillation of the methanol which is split off during the reaction. As soon as the amount of methyl ester groups in the starting mixture, which is assumed to be 100%, has dropped to the desired value, preferably to 10% or below, the water contained in the reaction mixture is removed by distillation. This water may possibly contain some methanol. If the residue solidifies at this time, the distillation is interrupted prior to the complete removal of the water and the mass is heated in the closed reaction vessel to a temperature above the melting point of the preliminary condensate. Thereafter, the pressure is gradually lowered back to normal pressure and the condensation is completed. In many instances, however, the temperature may be continually increased to the final desired value without interrupting the distillation.

The percentage composition of the preliminary condensate-water solutions depends upon the amount of water which is added thereto and upon the reaction time. This composition may be determined by potentiometric titration of the "free" amino groups (which are equivalent to the number of ester groups still present) as well as of the "salt-like bound" amino groups (which are equivalent to the number of resultant carboxyl groups formed by saponification of the ester groups) since the content of amide groups in the reaction mixture may be ascertained by subtracting these values from the amount of amino groups originally present.

Table 1 illustrates the relationship between the amount of water added and the reaction time with respect to the percentages of ester groups, salt groups and amide groups. The experiments were carried out on three different polyamides at condensation temperatures of 90° to 95° C. The results shown in Table 1 reflect experiments carried out with the following reaction mixtures:

(1) Dimethyl terephthalate/dimethyl isophthalate (25/75 mole percent) and hexamethylenediamine;
(2) Dimethylterephthalate and γ-trimethylhexamethylenediamine (mixture of the 2,2,4- and of the 2,4,4-isomer);
(3) Dimethyl terephthalate/dimethyl isophthalate (25/75 mole percent) and meta-xylylenediamine.

TABLE 1

| Ester/water (grams) | Time, hours | Ester groups, percent | Salt, percent | Amide, percent |
|---|---|---|---|---|
| | 0 | 100 | 0 | |
| 100/45 | 1 | 20 | 43 | 37 |
| | 3 | 13 | 48 | 30 |
| | 5 | 9 | 50 | 40 |
| | 7 | 7 | 50 | 41 |
| 100/75 | 1 | 15 | 55 | 33 |
| | 3 | 10 | 58 | 30 |
| | 5 | 7 | 60 | 32 |
| | 7 | 4 | 60 | 33 |
| 100/150 | 1 | 13 | 65 | 26 |
| | 3 | 5 | 67 | 22 |
| | 5 | 2 | 69 | 28 |
| | 7 | 1 | 69 | 39 |
| 100/300 | 1 | 5 | 79 | 10 |
| | 3 | 0 | 80 | 26 |
| | 5 | 0 | 80 | 20 |
| | 7 | 0 | 80 | 20 |

During the distillation of the water, which may contain methanol, up to a temperature of about 110° C., a further reduction in the concentration of methyl ester groups will be observed, the extent thereof depending upon the duration of the distillation. The composition of the reaction mixture will thus change at approximately the same extent as is to be expected, in accordance with Table 1, in a preliminary reaction time which is about twice as long as the duration of the distillation.

Moreover, it is possible to determine from comparisons of condensation experiments carried out in the melt under water-free conditions that from the thereafter still remaining methyl ester groups 25–30% of the methanol to be theoretically expected remains in the reaction mixture and reacts to form N-methylamino compounds or other undesirable by-products. Such by-products noticeably influence the properties of the end products if they are present in a concentration of above approximately 2 mole percent, relative to the number of carbonamide groups assumed to be present in the polyamide, which is taken to be 100%. Therefore, the reaction, conditions used during the preparation of the preliminary condensate should be chosen in such a manner, in accordance with the present invention, that immediately prior to the polycondensation of the essentially water-free preliminary condensate the content of methyl ester groups in the preliminary condensate be, at the most, about 6% of the originally employed quantity of methyl ester groups.

The following examples are given merely as illustrative of the present invention and are not to be considered as limiting thereof. For characterizing the end products obtained by the process of the present invention, the following measurements were used:

The degree of polycondensation was determined from a measurement of the relative viscosity from the relationship $\eta_{rel}=t_1/t_2$, wherein $t_1$ is the passage time of a liquid containing 1 gram of polyamide in 100 ml. of solution and $t_2$ is the passage time of the pure solvent in a capillary viscosimeter. Concentrated sulfuric acid was used as the solvent. The temperature employed in measuring the relative viscosity of the products was 25° C.

The Vicat temperatures were determined in accordance with VDE 0302/III. 43 in air.

The softening temperatures were measured by means of a penetrometer, the needle cross section of which was 1 mm.$^2$ at a total load of 350 grams.

The heating rate of the paraffin oil bath containing the test body was 1° C./min. The softening point was obtained at a depth of penetration of the needle of 0.1 mm.

Example I.—Preparation of polytrimethylhexamethyleneterephthalamide (a) 150 ml. of distilled water, 100 grams of dimethyl terephthalate and 84.7 grams of trimethylhexamethylenediamine (a mixture of the 2,2,4- and 2,4,4-isomers) were weighed into a round flask equipped with stirrer, descending cooler and nitrogen inlet tube. The temperature was maintained at 90–95° C. for seven hours and thereupon increased to 120° C., at which time the water distilled off within one and one-half hours. During the distillation of the water, the reaction mixture became solidified but melted again when the bath temperature was increased to 270° C. After six hours at 270° C., a thickly viscous colorless melt formed which, after cooling, had a relative viscosity of 2.71, a Vicat value of 158° C. and a softening point of 150° C. A polyamide having the same composition and made in the conventional manner from the corresponding salt demonstrated, at a relative viscosity of 2.6, a Vicat value of 157° C. and a softening point of 150° C. Differential thermal analysis of both polyamides revealed a completely coinciding curve configuration.

(b) Attempts to obtain the same polyamide by melting together dimethyl terephthalate and trimethylhexamethylenediamine failed as a result of the premature decomposition of the amine component.

(c) On the basis of a process which has been described in the prior art for the preparation of polyhexamethylenesebacamide, a mixture of 41.3 grams of dimethyl terephthalate, 36 grams of trimethylhexamethylenediamine and 8 ml. of water was heated to 270° C. under reflux for three hours. The water-methanol mixture was then distilled off and the reaction mixture was maintained at 270° C. for another six hours. Thereafter, a vacuum of approximately 1 Torr was applied for one and one-half hours. The end product had, at a relative viscosity of 2.55, a Vicat value of only 141° C. and a softening point of 140° C. Considerable amounts of ammonia and the cyclic imine produced from the diamine had distilled off during the reaction. During a further experiment which was carried out in the same manner, a product was obtained which had, at a relative viscosity of 2.4, a Vicat value of 145° C. and a softening point of 142° C. Consequently, it can be seen that products having constant properties cannot be made by this known process.

Example II.—Preparation of polytrimethylhexamethyleneterephthalamide

The procedure employed was the same as that described above in Example I(a) with the exception that in place of the 150 ml. of water, only 45 ml. of water was employed and that the preliminary condensation time was shortened to four hours. During the distillation of the water and during the heating step to 270° C., the batch remained liquid throughout. The end product was calculated to contain, in accordance with the conditions used for the preparation of the preliminary condensate, approximately 1.5 to 2% N-methyl groups; it had, at a relative viscosity of 2.2, a Vicat value of 152° C. and a softening temperature of 150° C.

Example III.—Preparation of polyhexamethyleneterephthalamide/isophthalamide 25 grams of dimethyl terephthalate, 75 grams of dimethyl isophthalate, 62.2 grams of hexamethylenediamine and 150 ml. of water were initially condensed, as in Example I(a), for seven hours at 90–95° C. The temperature was then raised to 270° C. for 90 minutes and the polycondensation was carried out at this tempertaure for six hours. At no time did a solidification of the contents of the flask set in. The end product was tough and colorless. It had a Vicat value of 137° C., a softening point of 122° C. and a relative viscosity of 2.4.

A polyamide having the same composition obtained from the salt had the same thermal properties at a relative viscosity of 2.6.

Example IV.—Preparation of polyhexamethyleneterephthalamide/isophthalamide 85 grams of dimethyl isophthalate, 15 grams of dimethyl terephthalate and 62.2 grams of hexamethylenediamine were stirred in the presence of 60 ml. of water, as in Example I(a), at 90° C. for four hours. The water was then distilled off during a period of one hour and the tempertaure was raised to 270° C. in the course of another hour. After a polycondensation time of six hours, a product having a relative viscosity of 2.34, a Vicat value of 130° C. and a softening point of 114° C. was obtained.

These values did not differ appreciably from those of a product having the same composition but which had been made from the corresponding salt.

Example V.—Preparation of polycaproamide/hexamethyleneterephthalamide 68 grams of dimethyl terephthalate, 41 grams of hexamethylenediamine and 74 grams of caprolactam were stirred, in the presence of 100 ml. of water, as in Example I(a), at 90 to 95° C. for four hours while the methanol was removed. Subsequently approximately 60 ml. of the methanol-water mixture was distilled off at 100° C. The remaining solution of the preliminary polymer was transferred to an autoclave which had been flushed with nitrogen several times and which was thereupon closed and heated to 250° C. The release of pressure down to normal pressure was effected by means of a needle valve in the course of about one-half hour. During this time, the temperature was raised to 270° C. and then maintained at this temperature for another six hours.

The resultant polycondensate was a hard, tough, crystalline mass whose crystalline melting point, as determined under a heating table polarization microscope, was found to be 255° C. The relative viscosity thereof was 3.1. A polyamide product having the same composition and made from a salt-caprolactam mixture in the presence of diphenyl ether, during the preparation of which a vacuum had been applied in the last stage, demonstrated the same crystalline melting point.

In accordance with the process of the present invention, it is also possible to prepare mixed polyamides which contain, besides residues of aromatic dicarboxylic acids and aliphatic diprimary diamines, the residues of aliphatic dicarboxylic acids, such as adipic acid or sebacic acid, amino acids or their lactams in condensed form. The process conditions to be employed in the preparation of the corresponding preliminary condensate solutions are virtually not affected at all by the presence of such polyamide-forming starting materials.

Any of the primary aliphatic diamines customarily used for the preparation of polyamides may be used as the diamine component in the process of the present invention, as long as there are no other reactive groups on the molecule. These include, for example, tetramethylenediamine, hexamethylenediamine, trimethylhexamethylenediamine, decamethylenediamine, etc.

When using mixtures of dimethyl isophthalate and dimethyl terephthalate with hexamethylenediamine, a ratio of 60 to 80 mole percent of dimethyl isophthalate and 40 to 20 mole percent of dimethylterephthalate is preferred.

The diester component and the diamine component are preferably reacted in approximately equivalent amounts. By equivalent amounts is meant that the number of ester groups to be reacted is approximately equal to the number of amino groups to be reacted.

The aromatic dicarboxylic acid to be employed is preferably terephthalic acid, isophthalic acid or a mixture thereof. However, substituted derivatives thereof which do not interfere with the polycondensation reaction may also be used, for example, aromatic dicarboxylic acids nuclear-substituted with one or several lower alkyl groups or with one or two halogen atoms. The term "lower alkyl" is meant to refer to alkyl groups containing less than five carbon atoms, such as methyl-, ethyl-, propyl-, butyl-, etc. There may be more than one alkyl group attached to the aromatic ring, such as the dimethyl, trimethyl, tetramethyl, diethyl, tetraethyl, tributyl, etc. derivatives. Halogen-substituted derivatives include those substituted by chloro-, bromo- and fluoro- in the aromatic ring. One or two halogens, the same or different, may be contained in the ring, such as dichloro-, dibromo-, difluoro-, chlorofluoro-, chlorobromo-, monochloro-, monobromo-, etc. derivatives.

The expression "normal pressure" herein is meant to refer to atmospheric pressure.

The invention being thus described, it will be obvious that the same may be varied in many ways. Such variations are not to be regarded as a departure from the spirit and scope of the invention and all such modifications as would be obvious to one skilled in the art are intended to be included within the scope of the following claims.

We claim:

1. A process for the preparation of polyamides which comprises forming a low molecular weight water-soluble preliminary condensate by heating a polyamide-forming reactant mixture consisting essentially of the dimethyl ester of a terephthalic or an isophthalic acid and an aliphatic diamine in the presence of water to a temperature of about 90° to 100° C., distilling off the resultant methanol-water mixture to the point of removing substantially all of the methanol formed in the reaction, and subsequently polycondensing the distillation residue at a temperature of between about 250° and 290° C. to form the desired high molecular weight, water-insoluble polyamide.

2. The process of claim 1, wherein the subsequent polycondensing step is carried out initially under excess pressure with a gradual reduction of the pressure to atmospheric pressure.

3. The process of claim 1, wherein the subsequent polycondensing step is carried out at atmospheric pressure.

4. The process of claim 1, wherein said aromatic dicarboxylic acid is selected from the group consisting of terephthalic acid, isophthalic acid and mixtures thereof.

5. The process of claim 1, wherein said diamine is an aliphatic diprimary diamine.

6. The process of claim 1, wherein said diamine is selected from the group consisting of tetramethylenediamine, hexamethylenediamine, trimethylhexamethylenediamine and decamethylenediamine.

7. The process of claim 1, wherein said reactant mixture also contains other polyamide-forming materials selected from the group consisting of aliphatic dicarboxylic acids, amino acids and lactams thereof.

8. A process for the preparation of polyamides which comprises forming a water-soluble preliminary condensate by heating a polyamide-forming reactant mixture consisting essentially of approximately equimolecular amounts of the dimethyl ester of a terephthalic or an isophthalic acid and an aliphatic diprimary diamine in the presence of at least 45 parts by weight of water per 100 parts by weight of said dimethyl ester to a temperature of about 90° to 100° C., distilling off the resultant methanol-water mixture to the point of removing substantially all of the methanol formed in the reaction, and subsequently polycondensing the distillation residue at a temperature of between about 250° and 290°C to form the desired high molecular weight, water-insoluble polyamide.

9. The process of claim 8, wherein prior to the subsequent polycondensing step the number of methyl ester groups in said preliminary condensate is at the most about 6% of the number of methyl ester groups contained in said reactant mixture.

10. The process of claim 8, wherein the subsequent polycondensing step is carried out initially under excess pressure with a gradual reduction of the pressure to atmospheric pressure.

11. The process of claim 8, wherein the subsequent polycondensing step is carried out at atmospheric pressure.

12. The process of claim 8, wherein said aromatic dicarboxylic acid is selected from the group consisting of terephthalic acid, isophthalic acid and mixtures thereof.

13. The process of claim 8, wherein said diamine is selected from the group consisting of tetramethylenediamine, hexamethylenediamine, trimethylhexamethylenediamine and decamethylenediamine.

14. The process of claim 8, wherein said reactant mixture also contains other polyamide-forming materials selected from the group consisting of aliphatic dicarboxylic acids, amino acids and lactams thereof.

References Cited

UNITED STATES PATENTS

| | | | |
|---|---|---|---|
| 2,163,636 | 6/1939 | Spanagel | 260—78 |
| 3,379,695 | 4/1968 | Wolfes et al. | 260—78 |
| 2,130,523 | 9/1938 | Carothers | 260—78 |
| 2,130,948 | 9/1938 | Carothers | 260—78 |
| 3,329,653 | 7/1967 | Beavers et al. | 260—78 |

FOREIGN PATENTS 794,365    4/1958    Great Britain.

HAROLD D. ANDERSON, Primary Examiner.

U.S. Cl. X.R.

260—95